United States Patent
Okamoto

(10) Patent No.: US 10,310,065 B2
(45) Date of Patent: Jun. 4, 2019

(54) RADAR DEVICE, SIGNAL PROCESSING DEVICE FOR RADAR DEVICE, AND SIGNAL PROCESSING METHOD

(71) Applicant: FUJITSU TEN LIMITED, Kobe-shi, Hyogo (JP)

(72) Inventor: Takayuki Okamoto, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 354 days.

(21) Appl. No.: 15/284,966

(22) Filed: Oct. 4, 2016

(65) Prior Publication Data
US 2017/0097409 A1    Apr. 6, 2017

(30) Foreign Application Priority Data
Oct. 5, 2015  (JP) ................. 2015-197989

(51) Int. Cl.
*G01S 7/35*    (2006.01)
*G01S 13/34*    (2006.01)
*G01S 13/42*    (2006.01)

(52) U.S. Cl.
CPC .............. *G01S 13/34* (2013.01); *G01S 7/352* (2013.01); *G01S 13/42* (2013.01); *G01S 2007/356* (2013.01)

(58) Field of Classification Search
CPC .......... G01S 13/34; G01S 13/42; G01S 7/352; G01S 2007/356
USPC ........................................................ 342/133
See application file for complete search history.

(56) References Cited

U.S. PATENT DOCUMENTS

| 4,307,398 A * | 12/1981 | Ward, Jr. .............. G01S 7/4008 327/3 |
| 7,667,637 B2 * | 2/2010 | Pedersen ................... G01S 7/35 342/104 |
| 9,541,638 B2 * | 1/2017 | Jansen .................. G01S 13/343 |
| 9,588,221 B2 * | 3/2017 | Sato ........................ G01S 13/34 |
| 2008/0042895 A1 | 2/2008 | Inaba |

FOREIGN PATENT DOCUMENTS

| JP | H08-278359 A | 10/1996 |
| JP | 2009-162688 A | 7/2009 |
| WO | 2006/085352 A1 | 8/2006 |

* cited by examiner

Primary Examiner — Frank J McGue
(74) Attorney, Agent, or Firm — Oliff PLC

(57) ABSTRACT

There is provided a radar device. A Fourier transform unit decomposes each of respective beat signals into a plurality of frequency components. A bearing computing unit specifies arrival angles of reflected-wave signals based on peak frequency components included in the plurality of frequency components, and calculates the signal intensities of arrival angle components of the reflected waves with respect to a plurality of neighborhood frequency components of the peak frequency components when the plurality of arrival angles of the reflected-wave signals are specified. A calculating unit selects one frequency component having the highest signal intensity from among the plurality of neighborhood frequency components, with respect to each of the arrival angles specified at a plurality of frequencies, and computes a distance between the radar device and a target on the basis of the one frequency component selected with respect to each of the arrival angles.

3 Claims, 11 Drawing Sheets

FREQUENCY SPECTRUM OF UP-BEAT
FREQUENCY COMPONENTS

FREQUENCY SPECTRUM OF DOWN-BEAT
FREQUENCY COMPONENTS

FIG. 12

| TARGET | ANGLE | UP-BEAT FREQUENCY | DOWN-BEAT FREQUENCY | DISTANCE | RELATIVE VELOCITY |
|---|---|---|---|---|---|
| TG1 | A1 | FU+1 | FD+1 | R1 | V1 |
| TG2 | A2 | FU | FD | R2 | V2 |

RADAR DEVICE, SIGNAL PROCESSING DEVICE FOR RADAR DEVICE, AND SIGNAL PROCESSING METHOD

TECHNICAL FIELD

The present invention relates to a radar device, a signal processing device for the radar device, and a signal processing method.

RELATED ART

Radar devices of the related art use, for example, a frequency-modulated continuous-wave (FMCM) system. In a case where a radar device computes a distance to a measurement object (hereinafter, referred to as a target), using modulation of, for example, the FMCW system, the radar device performs fast Fourier transform (FFT) on beat signals which are mixtures of a transmission wave with the reflected waves from the target, and detects a peak of the frequency spectrum. Subsequently, on the basis of the frequency of the peak, the radar device obtains the distance from the radar device to the target. Further, the radar device performs angle calculation on the basis of reception signals obtained from a plurality of receiving antennae, respectively, thereby specifying the arrival angles of the reflected waves. In this way, the radar device specifies the position of the target.

However, since FFT is for obtaining a frequency spectrum at each frequency domain component (also referred to as an FFT bin) which is a discrete value, in a case where the distance differences between targets are about 1 bin, when frequency spectra are obtained by performing FFT on beat signals based on the reflected waves from a plurality of targets, in some situations, one peak is obtained, whereby it is determined that the plurality of targets are equidistant from the radar device. However, in a case of obtaining an angle spectrum by subsequent angle calculation, it is possible to obtain the angles of the individual targets with the radar device.

Patent Document 1: WO 2006/085352
Patent Document 2: Japanese Patent Application Laid-Open No. 2009-162688

However, in the related art as described above, even though it is possible to obtain the angles of individual targets by angle calculation, in a case where there is a plurality of targets having distance differences corresponding to about 1 bin in the frequency spectrum, it may be determined that the targets are equidistant from the radar device, and it may be impossible to accurately obtain their distances. The reason is that, in a case where a radar device receives the reflected waves from a plurality of targets, there is a possibility that it may be impossible to sufficiently accurately determine the frequencies of peaks with respect to a plurality of targets having distance differences corresponding to about 1 bin in the frequency spectrum.

SUMMARY

It is therefore an object of the present invention to improve the accuracy of distance measurement on individual targets even in a case where there is a plurality of targets having distance differences corresponding to about 1 bin in the frequency spectrum.

According to an aspect of the embodiments of the present invention, there is provided a radar device comprising: a transmitting unit configured to transmit a transmission wave; a plurality of antennae configured to receive reflected waves of the transmission wave from a target; mixing units configured to generate respective beat signals from respective reception signals received by the plurality of antennae and a transmission signal of the transmission wave; and a signal processing unit, wherein the signal processing unit includes: a Fourier transform unit configured to decompose each of the beat signals into a plurality of frequency components; a bearing computing unit configured to specify arrival angles of reflected-wave signals on the basis of peak frequency components included in the plurality of frequency components obtained by decomposing each of the beat signals, and to calculate signal intensities of arrival angle components of the reflected waves with respect to a plurality of neighborhood frequency components of the peak frequency components in a case where the plurality of arrival angles of the reflected-wave signals are specified; and a calculating unit configured to select one frequency component having the highest signal intensity from among the plurality of neighborhood frequency components of the peak frequency components, with respect to each of the arrival angles specified at a plurality of frequencies, and compute a distance between the radar device and the target on the basis of the one frequency component selected with respect to each of the arrival angles.

According to the radar device, it is possible to improve the accuracy of distance measurement on individual targets even in a case where there is a plurality of targets having distance differences corresponding to about 1 bin in the frequency spectrum.

BRIEF DESCRIPTION OF THE DRAWINGS

Exemplary embodiments of the present invention will be described in detailed based on the following figures, wherein:

FIG. 12 is a view illustrating the results of computation of the frequencies, distances, and relative velocities of individual targets corresponding to angles.

DETAILED DESCRIPTION

Hereinafter, radar devices according to embodiments will be described with reference to the accompanying drawings.

The configurations of the following embodiments are just examples, and radar devices of the present invention are not limited to the configurations of the embodiments.

Comparative Example

Figure 1:
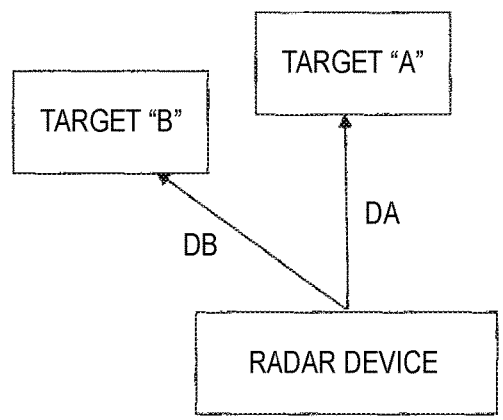
FIG. 1 is a view illustrating the relation between a radar device and targets according to a comparative example.

FIG. 1 shows the relation of a radar device according to a comparative example, a target "A", and a target "B". The radar device generates a transmission wave, for example, by performing high-frequency modulation on a signal in which the frequency varies in a triangular wave form, and transmits the transmission wave. Thereafter, the radar device receives the reflected waves from the targets "A" and "B", by a plurality of antennae, and generates beat signals from the received reflected waves and the transmission wave. The radar device performs Fourier transform on the beat signals, thereby obtaining the peaks of the frequency spectrum. On the basis of the peaks of the frequency spectrum, the radar device computes the distances from the targets "A" and "B" to the radar device. Also, on the basis of reception signals of the plurality of antennae having received the reflected waves, the radar device obtains the arrival angles of the reflected waves from the targets "A" and "B".

Figure 2:
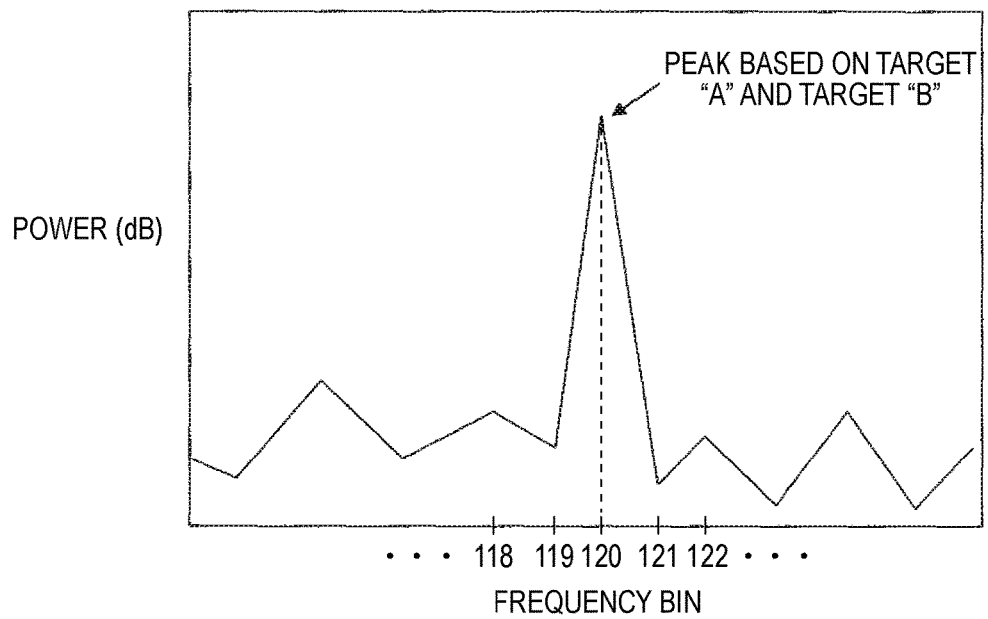
FIG. 2 is a view illustrating an example of the result of Fourier transform of beat signals obtained by the radar device.

FIG. 2 shows an example of the result of Fourier transform of the beat signals obtained by the radar device of FIG. 1. In a case where FIG. 2 is obtained by discrete Fourier transform or fast Fourier transform, the transverse axis is divided in units of a discrete value representing a frequency band called a frequency bin. Therefore, in a case where the distance DA between the target "A" and the radar device and the distance DB between the target "B" and the radar device are within a predetermined limits, the distance DA and the distance DB correspond to the same frequency bin (for example, 120th bin shown in FIG. 2). Here the frequency interval for one bin is about 468 Hz. More specifically, when the radar device obtains the peaks of the frequency spectrum, a convex-shaped parabolic approximation is performed using powers of 3 bins including a specific bin (for example, 120th bin shown in FIG. 2) which has relatively large power, a bin (for example, 119th bin shown in FIG. 2) which is one bin prior to the specific bin and has relatively small power, and a bin (for example, 121st bin shown in FIG. 2) which is one bin posterior to the specific bin and has relatively small power, and then the vertex of the approximated parabola is extracted as a peak. In this case, for example, the 120th bin is determined as a peak bin, whereas the 119th bin of frequency smaller than that of the 120th bin and the 121st bin of frequency larger than that of the 120th bin are not determined as the peak bin. If one target exists at a distance corresponding to the 120th bin and another target exists at a distance corresponding to the 119th bin, the one target existed at the distance corresponding to the 120th bin can be detected but the another target existed at the distance corresponding to the 119th bin cannot be detected. In other word, the peak can be extracted at the 120th bin, whereas no peak is extracted at the 119th bin.

For this reason, in the following first and second embodiments, a radar device for improving the accuracy of measurement of the distances of a plurality of targets in a case where the differences between the distances of the targets from the radar device are within predetermined limits, for example, the differences between the frequency bins of Fourier transform of beat signals are about 1 bin will be described.

First Embodiment

Figure 3:
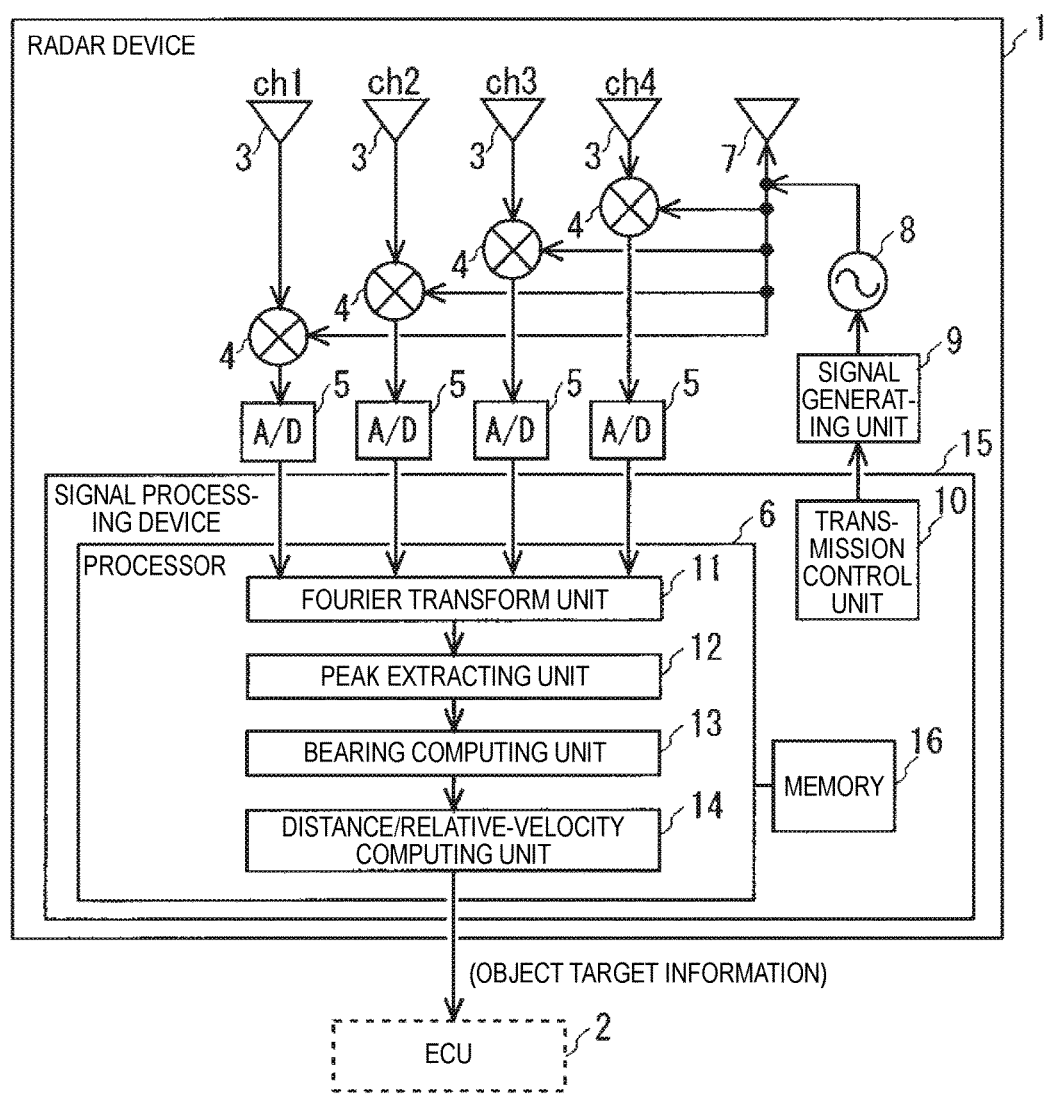
FIG. 3 is a view illustrating the configuration of a radar device according to a first embodiment.

FIG. 3 is a view illustrating the configuration of a radar device 1 according to the present embodiment. The radar device 1 is mounted on a vehicle, and monitors the surroundings of the vehicle, and detects targets such as other vehicles and obstacles. The target detection results are output to an electrical control unit (ECU) 2 for controlling the vehicle, and are used for some purposes such as control on the vehicle. However, the radar device according to the present embodiment can also be used for various other uses (such as monitoring of flying aircrafts and sailing vessels) other than for a vehicle.

The radar device 1 includes: receiving antennae 3 (ch1 to ch4) arranged at regular intervals; mixers 4 (ch1 to ch4) connected to the receiving antennae 3, respectively; A/D (Analog to Digital) converters 5 (ch1 to ch4) connected to the mixers 4, respectively; and a signal processing device 15 including a processor 6 configured to process data of the A/D converters 5. Also, the radar device 1 includes a transmitting antenna 7, an oscillator 8, a signal generating unit 9, and a transmission control unit 10.

As described above, the radar device 1 may include a receiving circuit dedicated for each receiving antenna 3. However, it is also possible to provide a receiving circuit for collectively receiving reception signals of all receiving antennae. In this case, control for performing switching on the receiving antennae 3 is required such that the receiving antennae sequentially correspond to the receiving circuit in a time division manner; however, the circuit configuration of the radar device 1 becomes compact.

Also, the radar device 1 has the receiving antennae 3 and the transmitting antenna 7 independent from one another; however, the receiving antennae 3 may serve as the transmitting antenna 7. In this case, immediately after transmission of a transmission wave, each antenna is switched to a receiving mode so as to be able to receive the reflected waves of the transmission wave.

If electric power is supplied from the vehicle to the radar device 1, the processor 6 executes a computer program, thereby implementing function units such as a Fourier transform unit 11, a peak extracting unit 12, a bearing computing unit 13, and a distance/relative-velocity computing unit 14. The processor 6 executes the computer program in cooperation with the memory 16, whereby those function units are implemented. However, for convenience of explanation, in FIG. 3, the individual function units are shown in the processor 6. Also, those function units are not necessarily limited to components which the processor 6 implements by executing the computer program. For example, all or some of the individual function units of FIG. 3 may be implemented by a dedicated arithmetic circuit disposed inside or outside the processor 6.

The transmitting antenna 7, the oscillator 8, the signal generating unit 9, and the transmission control unit 10 constitute an example of a transmitting unit. The receiving antennae 3 are examples of a plurality of antennae. The mixers 4 are examples of mixing units. The signal processing device 15 is an example of a signal processing unit. The distance/relative-velocity computing unit 14 is an example of a computing unit.

Figure 4:
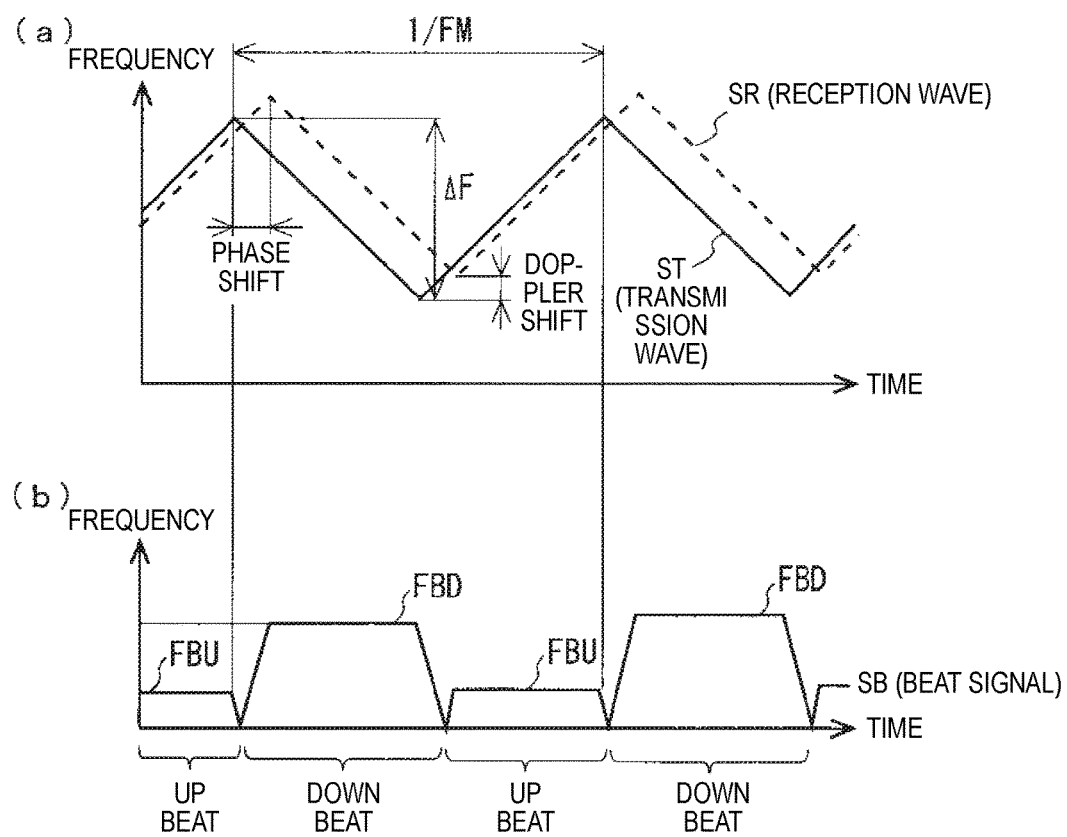
FIG. 4 is a view illustrating the waveforms of signals which are processed by the radar device.

FIG. 4 is a view illustrating the waveforms of signals which are processed by the radar device 1. In the first embodiment, the radar device 1 uses the FM-CW (frequency-modulated continuous-wave) system, and the signal generating unit 9 generates a transmission wave ST having a triangular waveform as shown in (a) of FIG. 4 under control of the transmission control unit 10, and the oscillator 8 modulates and transmits the transmission wave. Thereafter, if the reflected waves from a target are received as reception waves SR, the mixers 4 (ch1 to ch4) mix the reception waves with the transmission wave ST, thereby obtaining beat signals SB as shown in (b) of FIG. 4. In FIG. 4, the phase difference (phase shift) between the transmission wave ST and each reception wave SR varies in proportion to the distance between the target and the radar device, and the frequency difference (Doppler shift) between the transmission wave ST and each reception wave SR varies in proportion to the relative velocity between the target and the radar device. In FIG. 4, a reference symbol "FM" represents the frequency of the triangular wave which is generated by the signal generating unit 9. Meanwhile, in a case where there is a plurality of targets different in the distance and the relative velocity, each antenna receives a plurality of reflected waves different in the phase shift amount and the Doppler shift amount, and each mixer 4 (each of ch1 to ch4) obtains a beat signal SB including various components corresponding to the individual targets. In order to facilitate understanding, in FIG. 4, a waveform in a case where there is one target is shown as an example.

Hereinafter, the flow of processing which the processor 6 performs if electric power is supplied from the vehicle to the radar device 1 will be described according to the flow charts of FIGS. 5 and 6. In a case where the driving source of the vehicle becomes an operating state, for example, if the driving source is an internal combustion engine, in a case where the engine starts, or if the driving source is a hybrid system or an EV (electric vehicle) system, in a case where the power of the system is turned on, the processor 6 repeats the processing flow to be described below.

Figure 7:
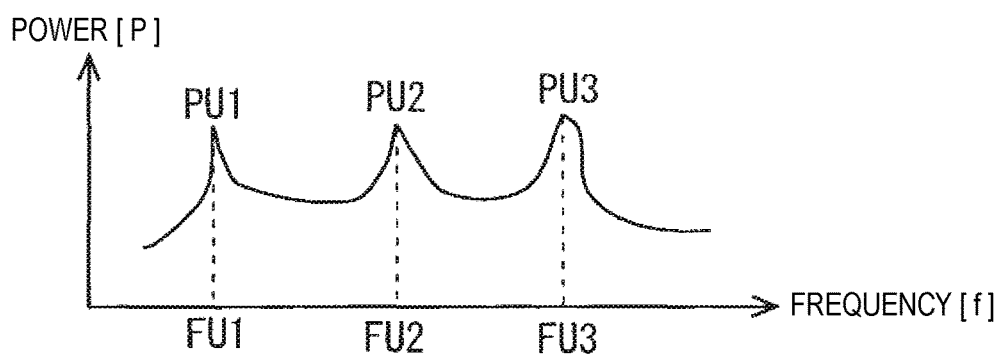
FIG. 7 is a view illustrating up-beat frequency components.
Figure 8:
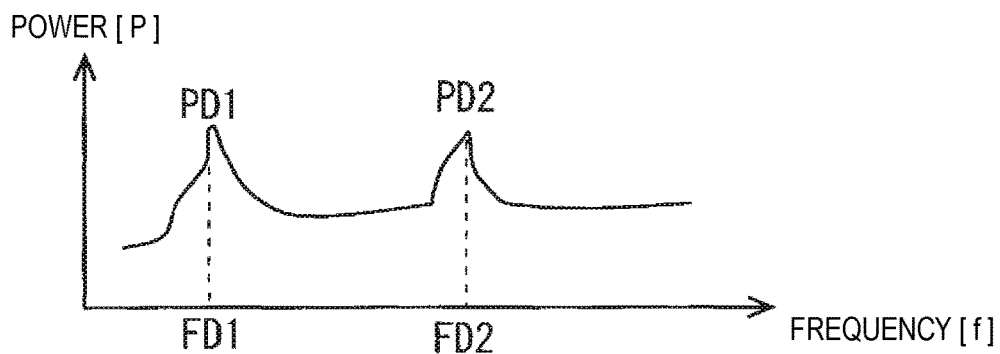
FIG. 8 is a view illustrating down-beat frequency components.

In STEP S101, the processor 6 performs Fourier transform on the up-beat frequency components FBU and down-beat frequency components FUD of the beat signal SB of each channel, thereby obtaining the frequency spectrum of the up-beat frequency components FBU as shown in FIG. 7, and the frequency spectrum of the down-beat frequency components FUD as shown in FIG. 8.

Since the individual receiving antennae 3 (ch1 to ch4) receives the reflected waves from the same target, the frequency spectra obtained from the individual receiving antennae 3 (ch1 to ch4) by Fourier transform have the same shape and the same peak frequencies. However, since the phases of the reception signals of the individual receiving antennae 3 (ch1 to ch4) are different, at the same frequency, the phases of the frequency spectra of the receiving antennae are different. For example, the peak PU1 (ch1) of the frequency spectrum of the receiving antenna 3 (ch1) and the peak PU2 (ch2) of the receiving antenna 3 (ch2) have the same frequency but have different phases.

From the frequency spectra of the up-beat frequency components FBU and the down-beat frequency components FUD obtained by Fourier transform, the processor 6 extracts peaks having powers equal to or higher than a predetermined threshold. Then, the processor extracts the frequencies, powers, and phases of the extracted peaks.

Figure 9:
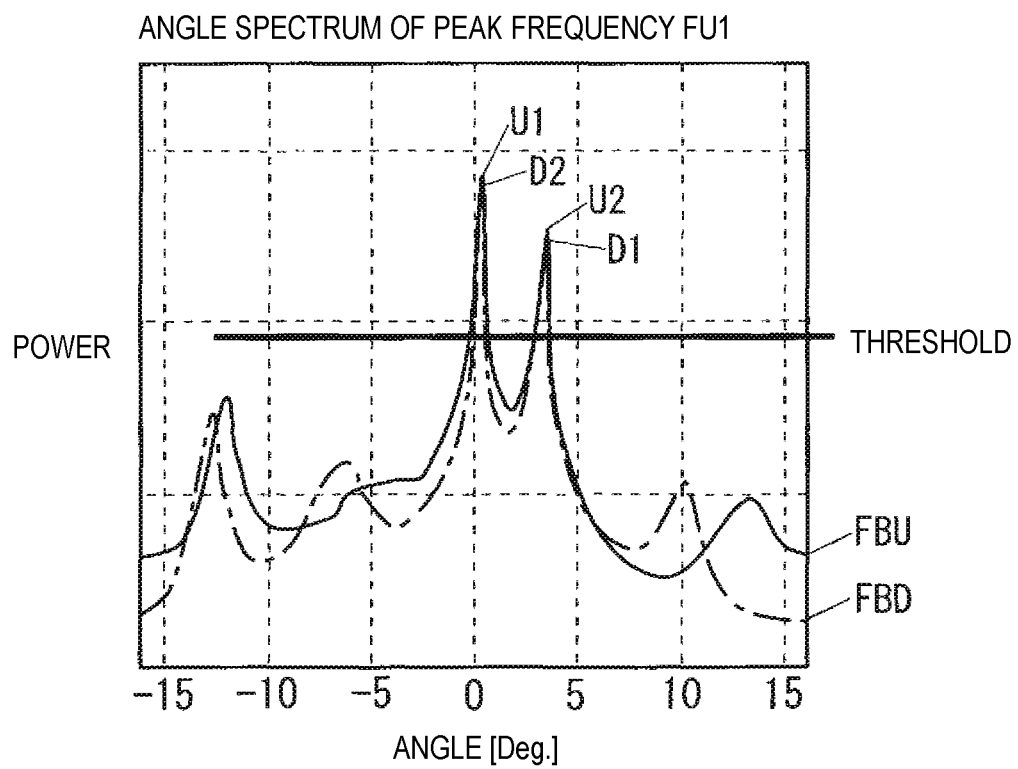
FIG. 9 is a view illustrating an example of an angle spectrum.

Since the peak of a frequency spectrum can include information on a plurality of targets, in STEP S102, the processor 6 separates targets from one peak, and estimates the angles of the separated targets. To this end, on the basis of peaks of the receiving antennae 3 (ch1 to ch4) having the same frequency, the processor 6 obtains the angle spectrum of the up-beat frequency components FBU and the angle spectrum of the down-beat frequency components FUD as shown in FIG. 9 by angle calculation. For example, as for the up-beat frequency components FBU, the peak PU1 (ch1), a peak PU1 (ch2), a peak PU1 (ch3), and a peak PU1 (ch4) shown in FIG. 7 are peaks having the same frequency FU1. Also, as for the down-beat frequency components FUD, a peak PD1 (ch1), a peak PD1 (ch2), a peak PD1 (ch3), and a peak PD1 (ch4) shown in FIG. 8 are peaks having the same frequency FD1. As described above, the processor 6 performs the process of STEP S102 by serving as the bearing computing unit 13. The process of the bearing computing unit 13 will be referred to as bearing computation or angle calculation.

As angle calculation for obtaining an angle spectrum, various methods such as a CAPON method and a DBF method have been devised. However, angle calculation is not limited to the method of obtaining an angle spectrum in the radar device 1 according to the present embodiment. For example, the processor 6 may be configured to obtain an angle spectrum on the basis of a predetermined angle estimation method (such as MUSIC, ESPRIT, or a maximum likelihood estimation method) in which it is required to preset the number of arrival waves as the number of angles which can be separated by using the eigenvalue and eigenvector of a correlation matrix formed from reception signals. For example, in a case of using ESPRIT, on the assumption that the source of the reflected waves is a spot source having no area, and the reflected waves are planar waves entering all receiving antennae in parallel, the processor 6 forms a correlation matrix from the reception signals, and estimates the arrival direction of the reflected waves on the basis of the properties of the matrix such as the eigenvalue and the eigenvector. Therefore, on the occasion of handling the correlation matrix and the eigenvalue, information on the number of arrival waves is required in advance.

Figure 10:
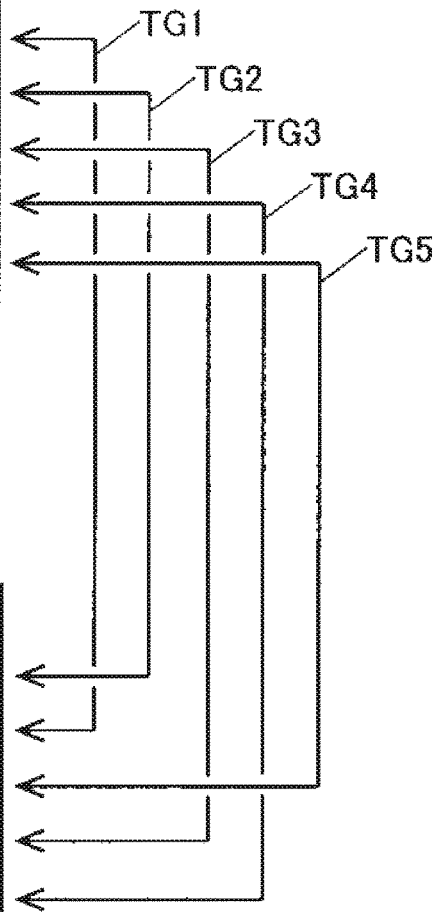
FIG. 10 is a view illustrating the angles and powers of individual peaks of angle spectra.

With respect to each peak frequency of the frequency spectrum, the processor 6 computes an angle spectrum by a predetermined angle estimation method. For example, from the frequency spectra shown in FIGS. 7 and 8, the processor 6 computes an angle spectrum with respect to each of five peak frequencies FU1 to FU3, FD1, and FD2. FIG. 9 shows an example of the angle spectrum of the peak frequency FU1 (and the angle spectrum of the peak frequency FD1) not only with the reference symbol "FBU" representing the up-beat frequency components but also with the reference symbol "FBD" representing the down-beat frequency components. Also, in the present embodiment, it is assumed that the peak frequency FU1 is paired with the peak frequency FD1 (see STEP S1031 of FIG. 6). Subsequently, with respect to each of the angle spectra of the five peak frequencies FU1 to FU3, FD1, and FD2, the processor extracts the angle and power of the peak of the corresponding angle spectrum. FIG. 10 shows examples of the angles and powers of the peaks of the individual angle spectra of the five peak frequencies FU1 to FU3, FD1, and FD2.

Subsequently, in STEP S103, the processor 6 performs distance/relative-velocity computation. In other words, if extracting the angles and powers of the peaks of the individual angle spectra, the processor 6 pairs the peaks, thereby specifying the actual target.

Figure 6:
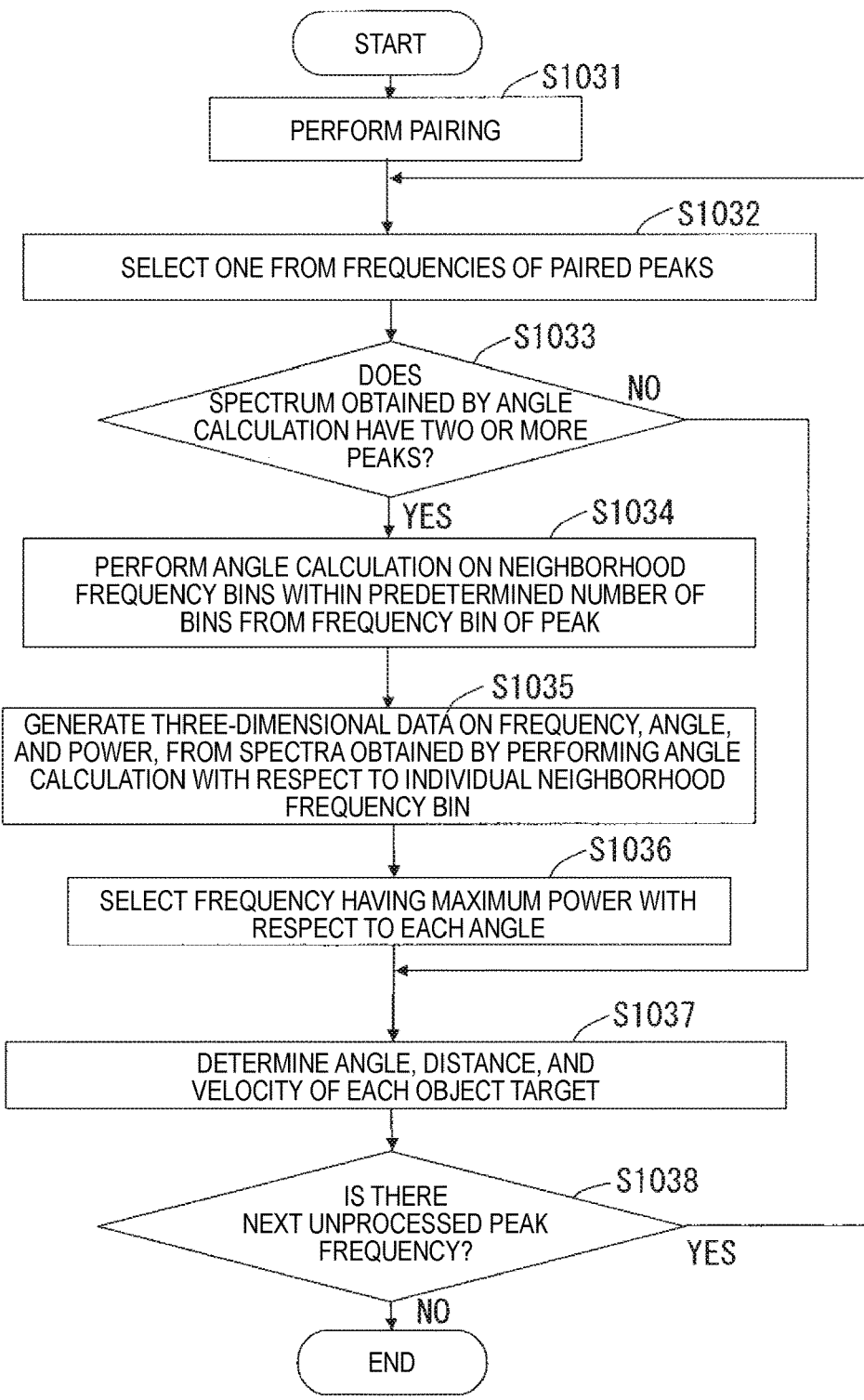
FIG. 6 is a view illustrating details of distance/relative-velocity computation.

FIG. 6 shows details of distance/relative-velocity computation of the present embodiment.

In STEP S1031, the processor 6 pairs the peaks of the angle spectra of the up-beat frequency components FBU with the peaks of the angle spectra of the down-beat frequency components FUD, such that each pair consists of peaks having similar angles and similar powers. For example, in the angle spectra shown in FIG. 9, at the peak frequency FU1, the angles and powers of the peak U1 and the peak U2 of the up-beat frequency components FBU are similar to the angles and powers of the peak D2 and the peak D1 of the down-beat frequency components FUD, respectively. For example, the peak U1 and the peak D2 have similar angles close to 0°, and the peak U2 and the peak D1 have similar angles close to 3°. Referring to FIG. 10, since the angle θU1 (for example, about 0°) and power PWU1 of the peak U1 are similar to the angle Θd2 (for example, about 0° and power PWD2 of the peak D2, the peak U1 and the peak D2 are paired, whereby a target TG1 represented by the peak U1 and the peak D2 is specified.

The processor 6 pairs the peaks (peaks U1 to U6) of the angle spectra of the up-beat frequency components FBU with the peaks (peaks D1 to D5) of the angle spectra of the down-beat frequency components FUD. As a result, the processor specifies five targets TG1 to TG5 as shown in FIG. 10. However, the peak U6 of the angle spectra of the up-beat frequency components FBU is not paired with any peak of the angle spectra of the down-beat frequency components FUD. Therefore, the processor determines that the peak U6 is a peak attributable to internal noise or the like, not to an actual target.

In STEP S1032, the processor 6 selects one from the frequencies of the paired peaks. For example, from the frequencies FU1 and FU2 of the paired peaks of the up-beat frequency components, the processor 6 selects the peak frequency FU1.

After an angle spectrum is obtained by performing angle calculation with respect to the selected peak frequency, in STEP S1033, the processor 6 determines whether the angle spectrum has a plurality of peaks equal to or higher than a predetermined threshold. In the example of FIG. 9, the angle spectrum of the frequency FU1 has the peaks U1 and U2 equal to or higher than the predetermined threshold. Also, in FIG. 9, the angle spectrum of the frequency FD1 has the peaks D1 and D2 paired with the peaks U2 and U1 of the angle spectrum of the frequency FU1, respectively.

In a case where it is determined in STEP S1033 that the angle spectrum has a plurality of peaks equal to or higher than the predetermined threshold, in STEP S1034, the processor 6 performs angle calculation with respect to bins being within a predetermined number of bins from the peak frequency selected in STEP S1032 (hereinafter, referred to as the neighborhood frequency bins). As the neighborhood frequency bins, for example, bins which are within a predetermined number of bins on either side of the peak frequency, for example, three bins on each side may be set. Specifically, if the peak frequency bin is the 120th bin, the angle calculation is performed in the range of 117th to 119th bins and the range of 121st to 123rd bins. Also, angle calculation of STEP S1034 may be calculation of the same type as that of STEP S102, or may be angle calculation of a type different from that of STEP S102. In the case where angle calculation of STEP S1034 is the same type as that of STEP S102 of FIG. 5, since the processor 6 can use the result of STEP S102 of FIG. 5 as the result of angle calculation relative to the bin of the peak frequency which is the current processing object, in STEP S1034, the processor needs only to perform angle calculation with respect to the neighborhood frequency bins other than the bin of the peak frequency which is the current processing object. Meanwhile, in a case where angle calculation of STEP S1034 is a type different from that of STEP S102 of FIG. 5, the processor 6 needs to perform angle calculation with respect to each of the neighborhood frequency bins including the bin of the peak frequency which is the current processing object. Also, angle calculation of STEP S1034 and bearing computation of STEP S102 of FIG. 5 correspond to processing of the bearing computing unit 13 of FIG. 3.

At this stage, by pairing of STEP S1031, the angle θU1 and power PWU1 of the peak U1 of the up-beat frequency components FBU has been already paired with the angle θD2 and power PWD2 of the peak D2 of the down-beat frequency components FUD. Similarly, the angle θU2 and power PWD2 of the peak U2 of the up-beat frequency components FBU has been already paired with the angle θD1 and power PWD1 of the peak D1 of the down-beat frequency components FUD. Therefore, in the present embodiment, the processor 6 may perform the process of STEP S1034 with respect to the up-beat frequency components FBU, without perform the process of STEP S1034 with respect to the down-beat frequency components FUD. Alternatively, the processor 6 may perform the process of STEP S1034 with respect to the down-beat frequency components FUD, instead of the up-beat frequency components FBU. Also, the processor 6 may perform the process of STEP S1034 with respect to the up-beat frequency components FBU and the down-beat frequency components FUD. In the case of performing angle calculation with respect to the up-beat frequency components FBU and the down-beat frequency components FUD, the processor 6 may calculate the average of the powers of corresponding angle peaks between the obtained two angle spectra, and use the average as the power of each angle.

In STEP S1035, on the basis of the angle spectrum of each of the neighborhood frequency bins, the processor 6 generates three-dimensional data of frequency, angle, and power. In other words, with respect to each neighborhood frequency bins, an angle spectrum is generated, and the power distribution is generated in two directions of angle and frequency.

Subsequently, in STEP S1036, with respect to each angle, the processor 6 selects a frequency having the maximum power.

Figure 11:
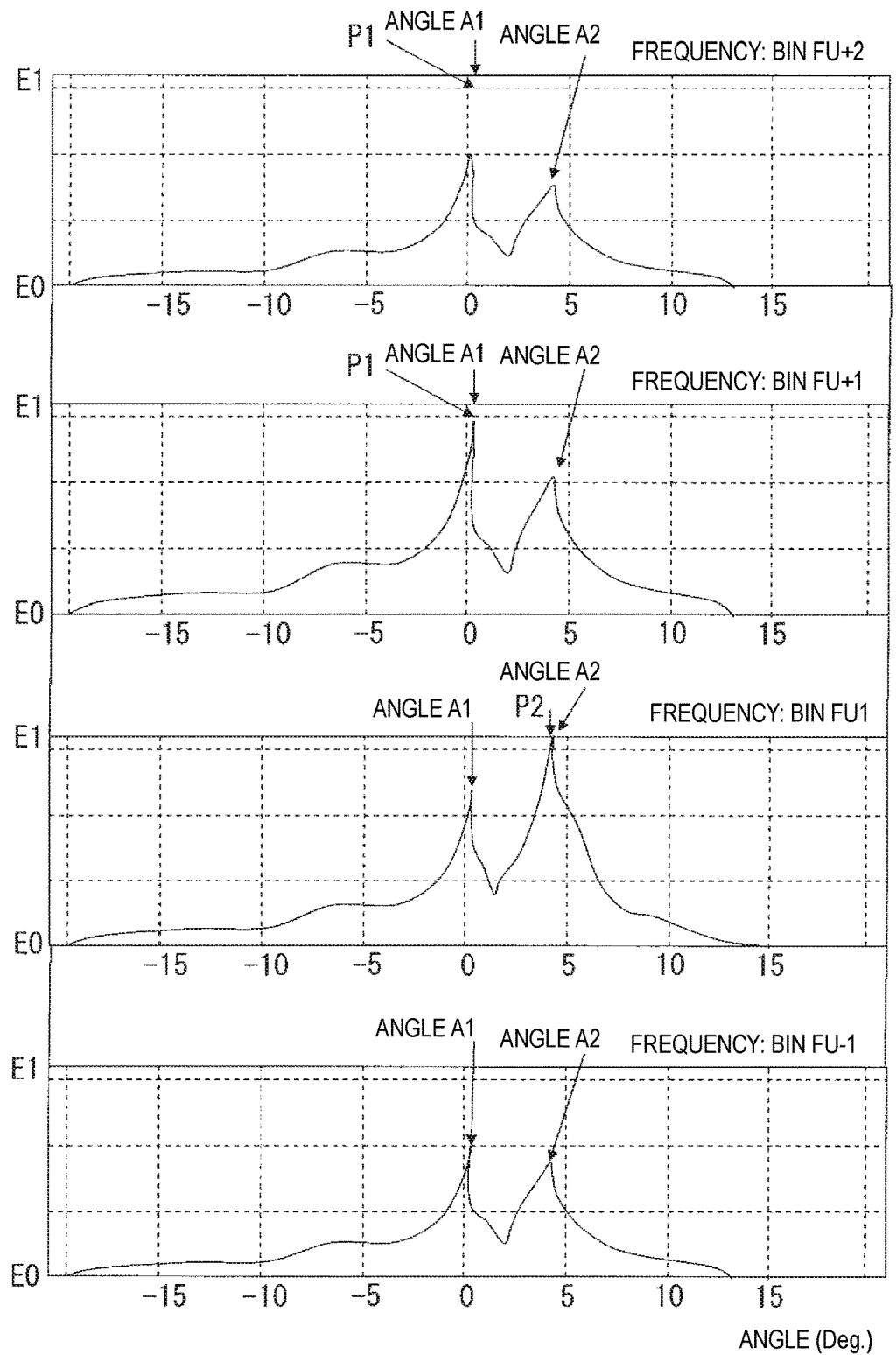
FIG. 11 is a view illustrating three-dimensional data of frequency, angle, and power.

FIG. 11 shows examples of three-dimensional data of frequency, angle, and power. In FIG. 11, the angle spectra of individual frequency bins FU1−1 (for example, 119th bin), FU1 (for example, 120th bin), FU1+1 (for example, 121st bin), and FU1+2 (for example, 122nd bin) are compared side by side. In FIG. 11, four graphs correspond to the frequency bins FU1−1, FU1, FU1+1, and FU1+2, respectively. Also, in each graph, the transverse axis represents angle, and the longitudinal axis represents power. In FIG. 11, the longitudinal axes of the four graphs have the same power range from E0 to E1.

In the examples of FIG. 11, for example, at an angle A1, as the frequency increases from the frequency bin FU−1, the power increases, and at the frequency bin FU+1, the power becomes the maximum value. Thereafter, the power decreases. Therefore, the processor 6 can determine that the distance of a target positioned in the direction of the angle A1 can be calculated from the frequency bin FU+1. Similarly, at the angle A2, at the frequency bin FU1, the power has the maximum value. Therefore, the processor 6 can determine that the distance of a target positioned in the direction of the angle A2 can be calculated from the frequency bin FU. In this way, the radar device of the present embodiment can more accurately specify the distance of a target positioned in each angular direction, as compared to the related art.

Subsequently, in STEP S1037, the processor 6 specifies the angle, distance, and velocity of each target. More specifically, after extracting the angles of the peaks of the individual angle spectra, and extracting the frequencies having the maximum powers with respect to the individual angles, the processor 6 specifies an actual target on the basis of each pair. In other words, on the basis of the frequency of each pair of peaks, the processor 6 calculates the angle, distance, and relative velocity of a corresponding target. At this time, if radar-wave propagation velocity is C, and the modulation frequency of the triangular wave which is generated by the signal generating unit 9 is FM, and the center frequency of the triangular wave is F0, and the modulated width of the triangular wave is ΔF, and the peak frequencies of the up beat and down beat of a pair are FU and FD, respectively, the distance R and relative velocity V of a target are derived by the following expressions.

$$R=((FU+FD)\cdot C)/(8\cdot\Delta F\cdot FM)$$

$$V=((FD-FD)\cdot C)/(4\cdot F0)$$

Also, in a case where the relative velocity V is 0 (accordingly, FU=FD), the distance R of the target is derived by the following expression.

$$R=(FU\cdot C)/(4\cdot\Delta F\cdot FM)$$

Subsequently, in STEP S1038, the processor 6 determines whether there is the next unprocessed peak frequency bin. In a case where there is the next unprocessed peak frequency bin, the processor 6 returns to the process of STEP S1032. Meanwhile, in a case where there is no next unprocessed peak frequency bin, the processor 6 finishes the distance/relative-velocity computation process.

FIG. 12 shows the results of computation of the frequencies, distances, and velocities of the targets TG1 and TG2 corresponding to the angle A1 and angle A2, respectively. In the present embodiment, as shown in FIG. 11, with respect to the angle A1, the up-beat frequency FU+1 having the maximum power is obtained. Also, in FIG. 12, similarly to the up-beat frequency, the down-beat frequency FD+1 having the maximum power is obtained. Further, with respect to the target TG1 of the angle A1, the processor 6 obtains a distance R1 and a relative velocity V1 from the up-beat frequency FU+1 and the down-beat frequency FD+1.

Meanwhile, with respect to the angle A2, the up-beat frequency FU having the maximum power is obtained. Also, in FIG. 12, similarly to the up-beat frequency, the down-beat frequency FD having the maximum power is obtained. Further, with respect to the target TG2 of the angle A2, the processor 6 obtains a distance R2 and a relative velocity V2 from the up-beat frequency FU and the down-beat frequency FD.

Returning to FIG. 5, in STEP S104, the processor 6 transmits data on the angles, distances, and powers of the individual targets to the ECU 2. The ECU 2 uses the data on the angles, distances, and powers of the individual targets for some purposes such as control on the vehicle.

As described above, in a case of detecting a plurality of angles from a peak of the frequency spectrum obtained with respect to the beat signals obtained from the transmission signal which is the transmission wave and the reception signals which are the reflected waves, the radar device 1 of the present embodiment performs angle calculation on a plurality of neighborhood frequency bins of a frequency bin corresponding to the peak of the frequency spectrum. Thereafter, with respect to the angle of each peak of the angle spectrum equal to or higher than the predetermined threshold, the radar device selects a frequency bin having the highest power, from the neighborhood frequency bins of the frequency bin of the peak, and calculates a distance. As a result of this process, with respect to a plurality of targets existing within a distance range of about 1 bin, it is possible to more accurately calculate the distances of targets existing at positions deviated from the distance of the frequency bin of the peak, as compared to the related art.

Figure 5:
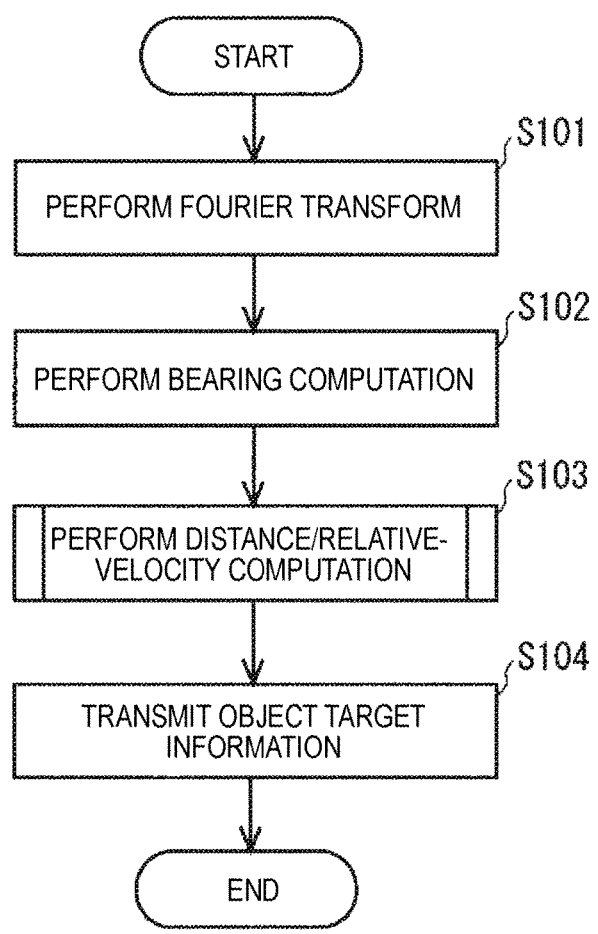
FIG. 5 is a view illustrating signal processing of the radar device of the first embodiment.

Also, bearing computation (angle calculation) of STEP S102 of FIG. 5 may be calculation with a very high level of accuracy, and angle calculation of STEP S1034 of FIG. 6 may be calculation with accuracy lower than that of STEP S102 of FIG. 5. The reason is that, if it is possible to accurately determine an arrival angle in bearing computation (angle calculation) of STEP S102 of FIG. 5 once, in STEP S1034, the arrival angle has been already known.

Second Embodiment

In the first embodiment, in the FM-CW type radar device 1, in a case where the spectrum obtained by angle calculation includes a plurality of peaks, the processor 6 performs angle calculation with respect to a plurality of neighborhood frequency bins of the frequency bin of each peak. Thereafter, with respect to the angle in the arrival direction of each reflected wave obtained by angle calculation, the processor 6 determines a frequency having the highest power, and determines the distance and relative velocity between the vehicle and a corresponding target. However, implementation of the present invention is not limited to the FM-CW system. In other words, the present invention can be applied to other devices such as an FCM (Fast Chirp Modulation) type radar device.

When the waveform of one period of a transmission wave in which the frequency varies like a saw-tooth wave is defined as one chirp, the FCM system transmits a plurality of chirps with a period shorter than that in the FMCW system, and receives reflected waves from a target, as reception signals. Subsequently, the FCM system obtains the differences between each of the reception signals and the transmission wave, thereby obtaining beat signals, and performs two-dimensional FFT (Fast Fourier Transform) on the beat signals, thereby obtaining the distance and relative velocity between the target and the radar device. Specifically, since the time delays of the reception signals relative to the transmission wave increase as the distance of the target increases, the frequencies of the beat signals are proportional to the distance. Therefore, if an FFT process is performed on each beat signal, a peak appears at the position of a frequency corresponding to the distance of the target. Also, since FFT can extract a reception level and phase information at each of frequency bins set at intervals of a predetermined frequency, accurately, a peak appears at a frequency bin corresponding to the distance of the target. Therefore, it is possible to obtain the distance to the target by detecting the peak frequency.

Now, relative velocity computation will be described. In a case where there is a relative velocity between the vehicle and the target, the FCM system detects a Doppler frequency between the beat signals, using phase change attributable to the Doppler frequency, thereby computing the relative velocity. In other words, if the relative velocity is 0, since there is no Doppler component between the reception signals, all of the phases of the reception signals related to the individual chirps become same. Meanwhile, in a case where there is a relative velocity between the vehicle and the target, a phase change is caused by a Doppler frequency between the reception signals related to the individual chirps. Since peak information obtained by performing FFT on the beat signals includes such phase information, if the peak information of the same target obtained from the individual beat signals is arranged in time series, and the second FFT is performed, the Doppler frequency is obtained from the phase information, and a peak appears at the position of the obtained frequency. This peak frequency corresponds to the relative velocity.

As described above, it is possible to compute the distance and the relative velocity by performing two-dimensional FFT on the beat signals.

Figure 13:
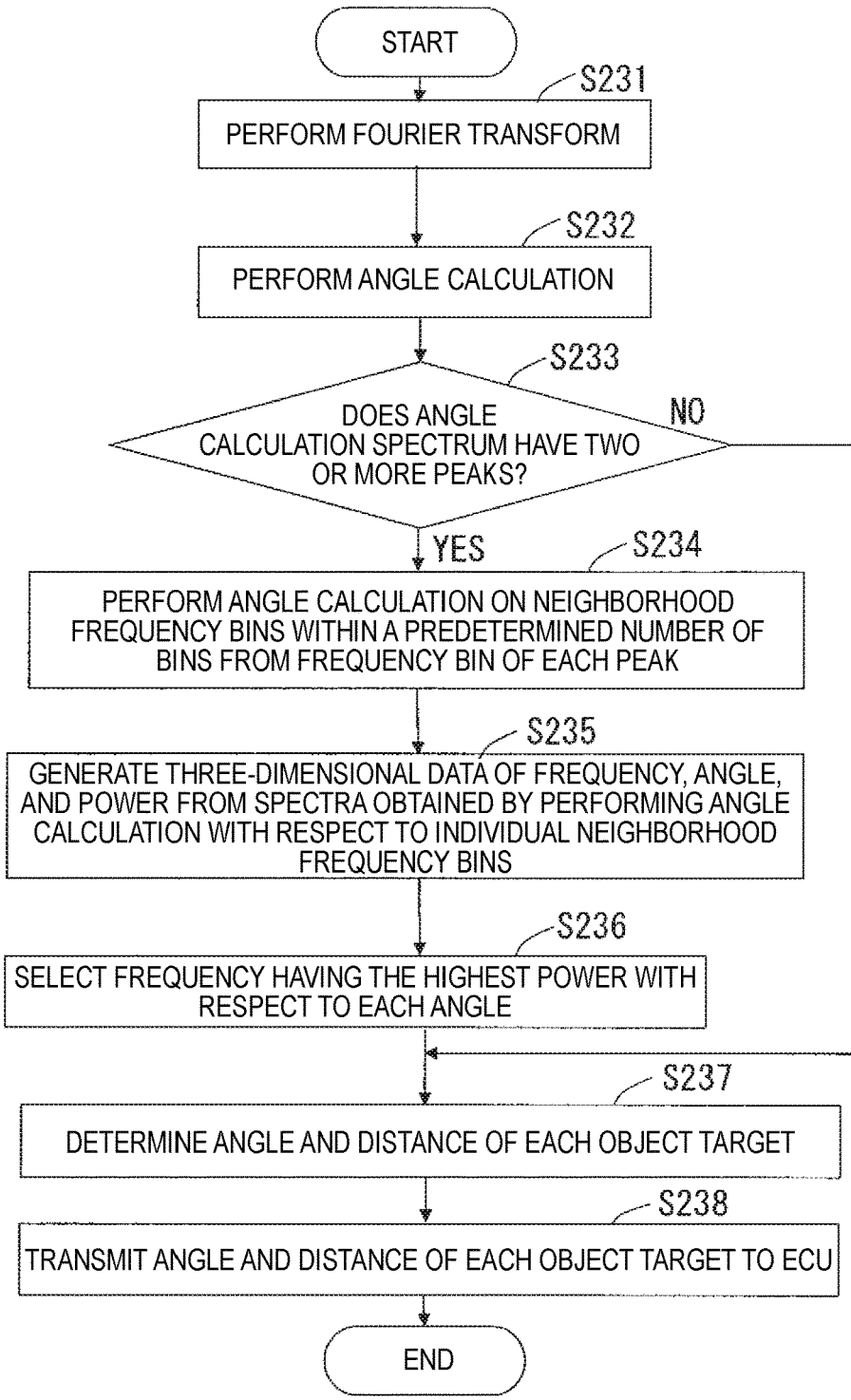
FIG. 13 is a view illustrating signal processing of a radar device of a second embodiment.

FIG. 13 illustrates processing of an FCM type radar using the processing of the radar device of the present invention. The radar device of the present embodiment is the same as the first embodiment except that it uses an FCM system. Therefore, the hardware configuration of the radar device of the present embodiment is the same as the hardware configuration of FIG. 3. The radar device of the present embodiment transmits a transmission signal from the transmitting antenna 7. Then, if the reflected waves from targets are received as reception signals, the radar device generates beat signals (ch1 to ch4) from the transmission signal and the reception signals by the mixers 4 and the A/D converters 5. Hereinafter, with reference to FIG. 13, processing of the radar device will be described. Also, in a case where the beat signals (ch1 to ch4) include a plurality of peak frequencies having powers equal to or higher than a predetermined threshold, the processing of FIG. 13 needs to be performed on the plurality of peak frequencies.

In STEP S231, the processor 6 performs FFT on the beat signals, thereby obtaining a frequency spectrum. Subsequently, the processor 6 extracts peaks having powers equal to or higher than the predetermined threshold, from the frequency spectrum, and obtains the frequencies of the extracted peaks.

Next, in STEP S232, the processor 6 performs angle calculation with respect to the peak frequencies extracted in STEP S231.

Subsequently, in STEP S233, the processor determines whether the spectrum obtained by the angle calculation includes a plurality of peaks having powers equal to or higher than the predetermined threshold.

In a case where the spectrum obtained by the angle calculation has a plurality of peaks having powers equal to or higher than the predetermined threshold, in STEP S234, the processor 6 performs angle calculation on frequency bins within a predetermined number of bins from the frequency bin of each peak. The angle calculation of STEP S234 may be calculation with accuracy lower than that of the angle calculation of STEP S232. The reason is that, if it is possible to accurately determine an arrival angle once, in STEP S234, the arrival angle can be determined.

Subsequently, in STEP S235, the processor 6 generates three-dimensional data of frequency, angle, and power, from the spectra obtained by performing angle calculation on the individual neighborhood frequency bins. The processes of STEPS S234 and S235 are identical to STEPS S1034 and S1035 of FIG. 6 of the first embodiment.

Subsequently, in STEP S236, with respect to each angle having an angle spectrum including peaks having powers equal to or higher than the predetermined threshold, the processor 6 selects a frequency having the highest power. The process of STEP S236 is identical to STEP S1036 of FIG. 6 of the first embodiment.

Subsequently, in STEP S237, from each selected frequency, the processor 6 specifies the distance of a corresponding target.

Next, in STEP S238, the processor 6 outputs the angle and distance of each target to the ECU.

As described above, according to the radar device of the present embodiment, even in a case where a plurality of targets is included within a distance range corresponding to one frequency bin, it is possible to accurately specify their distances. For example, in a case where there are two targets having peaks at the N-th frequency bin and the (N+1)-th frequency bin, as the result of Fourier transform, the peaks of the two targets may overlap at the N-th frequency bin (or the (N+1)-th frequency bin). In this case, the target which it is preferable to detect at the (N+1)-th frequency bin is detected at the N-th frequency bin, whereby an error occurs in distance calculation. Also, in some situations, the target which it is preferable to detect at the N-th frequency bin is detected at the (N+1)-th frequency bin, whereby an error occurs in distance calculation.

According to the processing of the first embodiment and the second embodiment, since it is possible to minimize deviations of one bin, for example, even in a case of controlling the distance between the vehicle and a preceding vehicle on the basis of the measurement results of the radar device, it is possible to accurately perform control.

Also, instead of the processing of the first and second embodiments, it can be considered to improve distance resolution. However, an improvement in the distance resolution results in an increase in the processing load, and can be difficult when cost is limited. In the processing of the first and second embodiments, during angle calculation (bearing computation of STEP S102 of FIG. 5), in a case where there is a possibility that a plurality of targets is included at a peak of the frequency spectrum, the processing of FIG. 6 is performed. Also, in the second embodiment, in a case where there is a possibility that a plurality of targets is included at a peak of the frequency spectrum in STEP S233, the processing of STEP S234 and the subsequent steps are performed. Therefore, it is possible to minimize influence on the processing time, and reduce deviations of one bin.

What is claimed is:
1. A radar device comprising:
a transmitter configured to transmit a transmission wave;
a plurality of antennae configured to receive reflected waves of the transmission wave from a target;
mixers configured to generate respective beat signals from respective reception signals received by the plurality of antennae and a transmission signal of the transmission wave; and
at least one hardware processor,
wherein the at least one hardware processor is configured to:
decompose each of the beat signals into a plurality of frequency components;
specify arrival angles of the reflected waves on the basis of peak frequency components included in the plurality of frequency components obtained by decomposing each of the beat signals, and to calculate signal intensities of arrival angle components of the reflected waves with respect to a plurality of neighborhood frequency components of the peak frequency components in a case where the plurality of arrival angles of the reflected waves are specified; and
select one frequency component having the highest signal intensity from among the plurality of neighborhood frequency components of the peak frequency components, with respect to each of the plurality of arrival angles, and compute a distance between the radar device and the target on the basis of the one frequency component selected with respect to each of the arrival angles.

2. A signal processor for a radar device comprising at least one hardware processor that is configure to:
- decompose each of respective beat signals generated from respective reception signals obtained by receiving reflected waves of a transmission wave from a target by a plurality of antennae, and a transmission signal of the transmission wave, into a plurality of frequency components;
- a specify arrival angles of reflected-wave signals on the basis of peak frequency components included in the plurality of frequency components obtained by decomposing each of the beat signals, and to calculate the signal intensities of arrival angle components of the reflected waves with respect to a plurality of neighborhood frequency components of the peak frequency components in a case where the plurality of arrival angles of the reflected-wave signals are specified; and
- select one frequency component having the highest signal intensity from among the plurality of neighborhood frequency components of the peak frequency components, with respect to each of the arrival angles specified at a plurality of frequencies, and compute a distance between the radar device and the target on the basis of the one frequency component selected with respect to each of the arrival angles.

3. A signal processing method comprising:
- decomposing each of respective beat signals generated from respective reception signals obtained by receiving reflected waves of a transmission wave from a target by a plurality of antennae, and a transmission signal of the transmission wave, into a plurality of frequency components;
- specifying arrival angles of reflected-wave signals on the basis of peak frequency components included in the plurality of frequency components obtained by decomposing each of the beat signals;
- in a case where the plurality of arrival angles of the reflected-wave signals are specified, calculating the signal intensities of arrival angle components of the reflected waves with respect to a plurality of neighborhood frequency components of the peak frequency components;
- selecting one frequency component having the highest signal intensity from among the plurality of neighborhood frequency components of the peak frequency components, with respect to each of the arrival angles specified at a plurality of frequencies; and
- computing a distance between the radar device and the target on the basis of the one frequency component selected with respect to each of the arrival angles.

* * * * *